Patented Oct. 31, 1933

1,932,819

UNITED STATES PATENT OFFICE 1,932,819

TREATING THIOCYANOGEN COMPOUNDS

Christian J. Hansen, Essen-on-the-Ruhr, Germany, assignor, by mesne assignments, to The Koppers Company of Delaware, Pittsburgh, Pa., a corporation of Delaware No Drawing. Application August 9, 1928, Serial No. 298,618, and in Germany May 15, 1928

5 Claims. (Cl. 23—119)

My invention refers to the treatment of thiocyanogen compounds, for instance ammonium thiocyanate or calcium thiocyanate, whereby these compounds can be converted into other commercially valuable products, for instance into ammonia and hydrogen sulphide or into sulphates, such as ammonium sulphate.

It is an object of my invention to provide means whereby this conversion can be effected in a simpler and more efficient manner than was heretofore possible.

It is another object of my invention to provide means whereby the cyanogen compounds contained in the gases resulting in the distillation of coal and which are recovered in form of thiocyanates when washing the gases, can be converted into commercially valuable products such as ammonium sulphate in a particularly simple and non-expensive manner, without the use of appreciable quantities of strong mineral acid such as sulphuric acid.

In the usual practice of purifying coal distillation gases only part of the reactive nitrogen contained therein is recovered in the more valuable form of ammonia or ammonium compounds, while another part is recovered in the form of thiocyanogen or its compounds. These latter products are not adapted as such for use as fertilizers. It has therefore been proposed to decompose them by means of dilute sulphuric acid or other strong mineral acids at atmospheric pressure and at a temperature of 50–110° C., according to the following reaction:

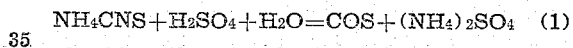

$$NH_4CNS + H_2SO_4 + H_2O = COS + (NH_4)_2SO_4 \quad (1)$$

Besides other drawbacks partly resulting from the highly corrosive properties of the strongly acid reaction liquor this method involves the great disadvantage that the reaction cannot be brought to completion and that great amounts of sulphuric acid or the like are required for the neutralization of the ammonia formed. This method furnishes satisfactory yields only if a considerable excess of sulphuric acid is used. Moreover the carbon sulphoxide formed in the reaction carries off the sulphur contents of the originally used thiocyanogen compounds and can hardly be utilized.

My invention is based on the discovery that thiocyanogen compounds, excepting the alkali thiocyanates, can be decomposed completely and in a much less expensive manner by merely heating them in the presence of water and preferably in the form of an aqueous solution under increased pressure to a temperature approaching or exceeding 200° C. Under these conditions the hydrolysis of the thiocyanogen compounds is not limited to the formation of carbon sulphoxide, but this latter compound is hydrolyzed also, carbon dioxide and hydrogen sulphide and ammonia being formed. The reaction which occurs in the practice of the present invention, may therefore be expressed by the following equation:

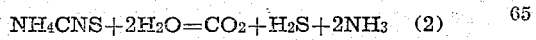

$$NH_4CNS + 2H_2O = CO_2 + H_2S + 2NH_3 \quad (2)$$

If thiocyanogen compounds other than the ammonium thiocyanate are used, this equation is modified accordingly.

In this manner thiocyanates of ammonium, of alkaline earth metals and of iron have been decomposed, while the thiocyanates of alkali forming metals (sodium and potassium) are not readily decomposable.

My discovery appears the more remarkable as hitherto no total decomposition of thiocyanogen compounds in the absence of at least equivalent amounts of free mineral acids had been observed, it having merely been known that ammonium thiocyanate, if heated to about 170–180° C., is partly converted into thiocarbamide (Proceedings Chemical Society, 20, p. 49–50).

It is further remarkable that the decomposition of the thiocyanates under the action of water or steam is substantially a quantitative one, the quantity of the products obtained approaching very closely 100 per cent of the calculated quantity, although the ammonia formed by hydrolysis is not absorbed by free mineral acid during the reaction, as is the case in hydrolysis by means of sulphuric acid. One could not expect that the step of merely raising the temperature and pressure would promote the hydrolytic reaction to such an extent that the use of strong mineral acid can be dispensed with and that even carbon sulphoxide is decomposed.

While the decomposition of thiocyanogen compounds by merely heating them in presence of ordinary water is a preferred way of carrying out the new method, it is to be understood that my invention is not limited to such cases where the reaction liquor is absolutely free from strong mineral acids, but also includes a method in which small amounts of such acids are present, provided that they do not suffice to neutralize all the ammonia formed in the reaction.

If, for instance, a watery solution of ammonium thiocyanate is heated to a temperature above 200° C., preferably between 250–300° C., perfect decomposition into ammonia, hydrogen sulphide and carbon dioxide will take place in a very short time. Preferably the watery solutions are heated to the respective temperature in a closed vessel or autoclave.

The solution containing the products of decomposition can then be treated in various ways. For instance, if ammonium thiocyanate is recovered in a plant which comprises means for removing ammonia and hydrogen sulphide by conversion into a thionate, the cooled solution may simply be treated in the manner above described, the ammonia and hydrogen sulphide being converted into ammonium salts, from which ammonium sulphate and sulphur can be recovered, while the carbon dioxide escapes.

It is however also possible to recover besides the solution also the gases resulting in the decomposition, while the solution is still under pressure, and to conduct the vapors containing water vapor, ammonia, hydrogen sulphide and carbon dioxide into the gas washers or to introduce them into the collecting vessels serving for operating the process. When heating the original solution of the thiocyanate in a closed vessel, the pressure will rise in proportion to the decomposition of the thiocyanate in solution. It is possible to substantially prevent a rise of pressure above the water vapor pressure of the solution by allowing the volatile products to escape from time to time or continuously from the vessel together with the water vapor.

It is further possible to subject the cooled-down solution itself or the vapors escaping from the closed vessel to treatment, whereby ammonia is recovered substantially in the same manner as in the treatment of the condensates resulting in the cooling of coal distillation gases.

The decomposition liquid or the hot vapors escaping from the autoclave may also be freed from carbon dioxide by acting thereon with lime, a pure solution of ammonium sulphide being then obtained.

Example 1

An aqueous solution of 100 kgs. ammonium thiocyanate in 400 kgs. water not containing any free sulphuric or phosphoric acid is heated during two to three hours to about 300° C. in a chrom-nickel-steel autoclave. The pressure resulting during the reaction rises to about 200–220 atmospheres. There are thus obtained 44.7 kgs. ammonia, 44.74 kgs. hydrogen sulphide and 57.8 kgs. carbon dioxide.

Example 2

A solution as described with reference to Example 1 is heated to about 300° C. in an autoclave. Shortly before reaching the temperature of reaction the vapors under pressure in the autoclave are allowed to escape from time to time or continuously and are subjected to a well known treatment for the recovery of ammonia.

Example 3

A solution containing 100 kgs. calcium thiocyanate in 400 kgs. water is treated as described with reference to Example 1. There result 21.79 kgs. ammonia, 43.62 kgs. hydrogen sulphide, 64.1 kgs. calcium carbonate and 28.2 kgs. carbon dioxide.

In the latter case a pure solution of ammonium sulphide is obtained which may be subjected to further treatment as described above or in some other suitable manner.

If iron thiocyanogen compounds are subjected to treatment, there are obtained iron sulphide and ammonium carbonate. If the treatment of the thiocyanogen compound is combined with a process of washing gases with a solution of a metal thionate, for instance iron thionate, the metal sulphide obtained can be returned into the washing liquor, for instance when regenerating the washing liquor containing iron sulphide with sulphur dioxide.

As shown above the conversion takes place under the mere action of water and it is of no avail which kinds of compounds are dissolved or in suspension in the thiocyanate solution. Decomposition in the presence of strong mineral acids such as sulphuric acid in amounts sufficient to neutralize all the ammonia formed in the reaction, or in excess thereover, with or without the use of steam, does not form part of the present invention.

Various changes may be made in the details disclosed in the foregoing specification without departing from the invention or sacrificing the advantages thereof.

I claim:—

1. The method of decomposing thiocyanogen compounds other than those of the alkali forming metals comprising acting on such compounds under increased pressure and at a temperature near and above 200° C. with water substantially free from strong mineral acid.

2. The method of decomposing ammonium thiocyanate comprising heating in a closed vessel to about 250–300° C. an aqueous solution of ammonium thiocyanate substantially free from strong mineral acid.

3. The method of decomposing thiocyanogen compounds other than those of the alkali forming metals comprising acting on such compounds under increased pressure and at a temperature between 250 and 300° C. with water substantially free from strong mineral acid.

4. The method of decomposing ammonium thiocyanate comprising heating in a closed vessel to about 250–300° C. an aqueous solution of ammonium thiocyanate substantially free from strong mineral acid and combining the ammonia and the hydrogen sulphide resulting in the reaction to form ammonia salts.

5. The method of decomposing ammonium thiocyanate comprising heating in a closed vessel to about 250–300° C. an aqueous solution of ammonium thiocyanate substantially free from strong mineral acid and combining the ammonia and the hydrogen sulphide resulting in the reaction to form ammonium sulphate and sulphur.

CHRISTIAN J. HANSEN.